US011617386B2

(12) United States Patent
Kim

(10) Patent No.: US 11,617,386 B2
(45) Date of Patent: Apr. 4, 2023

(54) BUBBLE STERILIZING CLEANER

(71) Applicants: Chan Ju Kim, Ansan-si (KR); EHYGIENE CO., LTD., Gunpo-si (KR)

(72) Inventor: Chae Woo Kim, Ansan-si (KR)

(73) Assignees: Chan Ju Kim, Ansan-si (KR); EHYGIENE CO., LTD., Gunpo-si (KR)

(*) Notice: Subject to any disclaimer, the term of this patent is extended or adjusted under 35 U.S.C. 154(b) by 342 days.

(21) Appl. No.: 16/884,465

(22) Filed: May 27, 2020

(65) Prior Publication Data

US 2020/0281247 A1 Sep. 10, 2020

Related U.S. Application Data

(63) Continuation of application No. PCT/KR2019/001661, filed on Feb. 12, 2019.

(30) Foreign Application Priority Data

Mar. 7, 2018 (KR) .................. 10-2018-0027148

(51) Int. Cl.
*A23N 12/02* (2006.01)
*A23B 7/158* (2006.01)
(Continued)

(52) U.S. Cl.
CPC .............. *A23N 12/02* (2013.01); *A23B 7/158* (2013.01); *B01F 23/2311* (2022.01);
(Continued)

(58) Field of Classification Search
CPC ...... A23N 12/02; A23N 12/023; A23N 12/06; A23N 12/00; A23N 12/04; A23N 15/00;
(Continued)

(56) References Cited

U.S. PATENT DOCUMENTS 1,705,544 A * 3/1929 Schmidt ................. A23N 12/02
134/131
1,724,639 A * 8/1929 Burch ..................... A23N 12/02
134/68
(Continued)

FOREIGN PATENT DOCUMENTS

GB 2349804 A * 11/2000 ........... A23N 12/023
JP 08197013 8/1996
(Continued)

OTHER PUBLICATIONS

Kim, "Micro bubble cleansing device", Jan. 2017, Kr 10-1697174-B1—Machine translation (Year: 2017).*

(Continued)

*Primary Examiner* — David G Cormier
*Assistant Examiner* — Thomas Bucci
(74) *Attorney, Agent, or Firm* — Cantor Colburn LLP

(57) ABSTRACT

Provided is a bubble sterilizing cleaner capable of automatically sterilizing and objects to be cleaned to be cleaned, such as fruits and vegetables. The bubble sterilizing cleaner includes a bubble supply unit for spraying microbubbles into a cleaning tank and an aeration unit for discharging water or air to the cleaning tank to improve sterilizing and cleaning efficiency and reduce cleaning time, and includes a fluid supply means connected with a water inlet of the cleaning tank and the aeration unit to supply a fluid so that the water supply rate is adjustable in accordance with a condition of an installation location thereof.

4 Claims, 7 Drawing Sheets

(51) Int. Cl.
  *B08B 3/10* (2006.01)
  *B08B 3/12* (2006.01)
  *B01F 23/231* (2022.01)
  *B01F 35/71* (2022.01)
  *B01F 35/221* (2022.01)

(52) U.S. Cl.
  CPC ........ *B01F 35/2211* (2022.01); *B01F 35/712* (2022.01); *B01F 35/71805* (2022.01); *B08B 3/102* (2013.01); *B08B 3/12* (2013.01); *A23V 2002/00* (2013.01); *B01F 23/23113* (2022.01); *B01F 23/231153* (2022.01)

(58) Field of Classification Search
  CPC ...... A23B 7/158; A23B 7/06; A23V 2002/00; A23L 5/57; A22C 21/04; A22C 21/0061; A22C 17/08; B08B 3/102; B08B 3/12; B01F 35/712; B01F 35/2211; B01F 35/71805; B01F 23/231153; B01F 23/23113
  USPC ...................................................... 134/57 R
  See application file for complete search history.

(56) References Cited

U.S. PATENT DOCUMENTS

| | | | | | |
|---|---|---|---|---|---|
| 1,772,669 | A | * | 8/1930 | Lane | A23N 12/02 134/74 |
| 1,931,463 | A | * | 10/1933 | Brogden | A23N 12/02 134/68 |
| 2,111,285 | A | * | 3/1938 | Haynie | A23N 12/02 134/131 |
| 2,249,792 | A | * | 7/1941 | Skinner | A23B 7/005 99/330 |
| 2,703,647 | A | * | 3/1955 | Canning | A23N 12/023 209/458 |
| 5,879,732 | A | * | 3/1999 | Caracciolo, Jr | C02F 9/00 426/81 |
| 6,213,308 | B1 | * | 4/2001 | Bajema | A23N 12/023 209/393 |
| 6,494,222 | B1 | * | 12/2002 | Mitsumori | B08B 3/12 134/184 |
| 10,785,996 | B2 | * | 9/2020 | Giardino | B01F 25/313311 |
| 2001/0047814 | A1 | * | 12/2001 | Nwoko | A23B 7/158 134/32 |
| 2006/0078661 | A1 | * | 4/2006 | Wang | A23B 7/158 426/521 |
| 2006/0102193 | A1 | * | 5/2006 | Lyubchik | B08B 3/12 134/1 |
| 2006/0127551 | A1 | * | 6/2006 | Lewis | A23B 7/153 426/506 |
| 2007/0137678 | A1 | * | 6/2007 | Bertolini | A23N 12/02 134/67 |
| 2008/0178912 | A1 | * | 7/2008 | Chen | A23N 12/02 134/104.3 |
| 2008/0264843 | A1 | * | 10/2008 | Yamasaki | B01F 35/2112 210/150 |
| 2011/0220158 | A1 | * | 9/2011 | Ho | B01F 23/2323 134/198 |
| 2016/0100620 | A1 | * | 4/2016 | Massey | A23B 4/30 99/534 |
| 2017/0208826 | A1 | * | 7/2017 | Lynn | B01D 46/0036 |
| 2017/0332892 | A1 | * | 11/2017 | Yang | B08B 3/14 |
| 2018/0001355 | A1 | * | 1/2018 | Shibata | B08B 3/102 |

FOREIGN PATENT DOCUMENTS

| | | | | |
|---|---|---|---|---|
| JP | 08197013 A | * | 8/1996 | |
| JP | 11314025 | | 11/1999 | |
| KR | 20030079213 | | 10/2003 | |
| KR | 2020110000769 | | 1/2011 | |
| KR | 1020140092072 A | * | 10/2013 | ............ A23N 12/02 |
| KR | 101360225 | | 2/2014 | |
| KR | 1020140092072 A | | 7/2014 | |
| KR | 101441017 | | 9/2014 | |
| KR | 101697174 | | 1/2017 | |
| KR | 101697174 B1 | * | 1/2017 | ............ A23N 12/02 |
| KR | 101933582 | | 12/2018 | |

OTHER PUBLICATIONS

KIM et al., "Environmentally-friendly micro bubble cleansing device", Oct. 2013, KR 10-2014-0092072-A—Machine translation (Year: 2013).*

Murata et al., "Washer", Aug. 1996, JP-08197013-A—Machine translation (Year: 1996).*

International Search Report—PCT/KR2019/001661 dated May 24, 2019.

* cited by examiner

BUBBLE STERILIZING CLEANER

TECHNICAL FIELD

The present disclosure relates to a bubble sterilizing cleaner capable of automatically sterilizing and objects to be cleaned, such as fruits and vegetables. More particularly, the present disclosure relates to a bubble sterilizing cleaner, which includes a bubble supply unit spraying microbubbles into a cleaning tank and an aeration unit discharging water or air to the cleaning tank to improve the cleaning and aeration efficiency and to reduce cleaning time, and includes a fluid supply means connected to a water inlet of the cleaning tank and the aeration unit to supply a fluid to control the water supply rate in accordance with a condition of an installation thereof.

BACKGROUND ART

In general, a large amount of food is cooked and supplied in large restaurants in rest areas or school meal facilities used by many people. Compared to small restaurants, the amount of fruits and vegetables that are food ingredients is relatively high.

When fruits and vegetables cleaned and cooked, it takes only a long time to prepare the food ingredients, and requires a lot of workers for the cleaning. As a result, labor costs may be wasted excessively.

In particular, when a worker manually cleans a lot of fruits and vegetables, the cleaning time is long and it is difficult to properly clean each food ingredient. Whereby, cleaning quality may be deteriorated.

The deterioration of the cleaning quality directly relates to deterioration of food quality. This may degrade the restaurant's assessment, reduce the competitiveness thereof, and harm customer health due to unsanitary food.

A large number of techniques for a cleaner have been proposed, wherein the cleaner is capable of quickly and properly cleaning a large amount of food ingredients and reducing waste of labor costs by using automatic cleaning.

As a related art, Korean utility model application publication No. 20-2011-0000769 (published Jan. 24, 2011) provided a washing device supplying oxygen microbubbles in a washing device for vegetables and dishes, a half-body bath for washing hands and feet, a foot bath device, a face washing device, or a bath device so as to have an effect of cleaning and massage by fine bubbles.

The above invention disclosed in the published design is configured such that a plate-shaped frame provided to mount a motor, a pump integrally provided with the motor, a high pressure tank, and a cleaning tank thereon, and a casing and the cleaning tank having an integral shape to cover the above components are fastened to the frame, and an intake head and an bubble head are fastened to a pair of fastening frames mounted to the frame and received in the casing, the heads allowing the casing and the cleaning tank to be fastened in close contact each other.

However, the invention disclosed in the published design is provided with only a microbubbles generation device, thus it is difficult to guarantee more powerful cleaning performance, and when a variety of foreign matter or dirt that is separated from objects to be cleaned during the cleaning floats in cleaning water, the worker should manually remove them. In addition, when the removal operation is not continuously performed, the foreign matter may be attached to the objects to be cleaned to cause poor cleaning quality.

As another related art, Korean patent application publication No. 10-2003-0079213 (Oct. 10, 2003) provided a washing apparatus which makes ionized water by blowing ionized gas generated by using plasma into water, and by using the ionized water, cleans and sterilizes fruits and vegetables more strongly to remove harmful substances attached to surfaces thereof. Whereby, the washing apparatus may reliably neutralize and remove the harmful substances caused by the use of preservatives and excessive pesticides that are present on imported agricultural products that require transportation that takes a long time.

However, since the invention disclosed in the published patent simply blows the ionized gas into water, when the supply of the ionized gas is stopped, foreign matter removed from the objects to be cleaned is again attached to the objects to be cleaned thereby it is difficult to fundamentally clean pesticides, bacteria, etc. from the objects to be cleaned. In addition, since the ionized gas is constantly supplied into the cleaning water to maintain the saturation rate of the ionized gas so that the cleaning water can be formed into the ionized water, the use rate of the ionized gas is excessively required in comparison with the cleaning effect thus deteriorating efficiency thereof.

In the related art, a water level should be maintained above a predetermined level by additionally supplying the amount of the cleaning water discharged during the cleaning. However, since the supply of the cleaning water is entirely dependent only on the amount or pressure of water of a water source, such as tap water, when the amount or pressure of water is low, it is difficult to repeatedly clean a large amount of the objects to be cleaned due to the low water level and the worker should check the water level often to control the supply of the cleaning water.

DISCLOSURE

Technical Problem

Accordingly, the present disclosure has been made keeping in mind the above problems occurring in the related art, and an objective of the present disclosure is to provide a bubble sterilizing cleaner. Wherein the bubble sterilizing cleaner includes a bubble supply unit and an aeration unit that generate microbubbles and a vortex in cleaning water so as to ensure excellent sterilization and cleaning effects and quick cleaning in comparison with the related art. In particular, the bubble sterilizing cleaner is configured to be capable of changing a water supply method of cleaning water according to the amount or pressure of water of a water source in which the bubble sterilizing cleaner is installed.

Another objective of the present disclosure is to provide a bubble sterilizing cleaner. Wherein the bubble sterilizing cleaner includes a first supply tube connecting the water source to a water inlet, a second supply tube branching from the first supply tube and connected to the aeration unit, and a water supply control valve provided at a branching part between the first and second supply tubes, so that water is supplied through the water source and is discharged when the amount or pressure of water of the water source is high.

On the contrary, the bubble sterilizing cleaner includes the first supply tube connecting the water source to the water inlet and a second supply tube connecting a fluid supply device to the aeration unit, so that the aeration unit is operated through the fluid supply device that is separately provided from the water source to perform water supply and discharge of water or air, when the amount or pressure of water of the water source is low.

Further objective of the present disclosure is to provide a bubble sterilizing cleaner. Wherein the bubble sterilizing cleaner includes an overflow hole provided at a side wall portion of the cleaning tank, a water reservoir tank provided at an exterior of the side wall portion and storing cleaning water discharged from the overflow hole, and a fluid sensor configured to sense a fluid in the water reservoir tank, so that the water supply rate of the cleaning water is controlled according to the discharge amount of the cleaning water to maintain a water level in the cleaning tank constant within a normal range. That is, in the bubble sterilizing cleaner, the water supply rate of the fluid supply means is controlled by the fluid sensor.

Technical Solution

In order to accomplish the above object, the present disclosure provides a bubble sterilizing cleaner.

The bubble sterilizing cleaner includes a cleaning tank having a water inlet and in which cleaning water may be stored.

The bubble sterilizing cleaner includes a bubble supply unit configured to generate microbubbles and spray the microbubbles into the cleaning tank.

The bubble sterilizing cleaner includes an aeration unit provided at one or more locations of an upper portion of the cleaning tank, a side wall portion thereof, and a bottom portion thereof, and configured to discharge water or air to the cleaning tank The bubble sterilizing cleaner includes a fluid supply means connected to one of the water inlet and the aeration unit or to both the water inlet and the aeration unit to supply a fluid thereto.

The bubble sterilizing cleaner according to the present disclosure may be configured as follows.

The fluid supply means may include a first supply tube, a second supply tube, and a water supply control valve, the first supply tube connecting a water source to the water inlet, the second supply tube branching from the first supply tube and being connected to the aeration unit, and the water supply control valve being provided at a branching part between the first and second supply tubes.

Also, the bubble sterilizing cleaner according to the present disclosure may be configured as follows.

The fluid supply means may include a second supply tube and a water supply control valve, the second supply tube connecting a water source to the aeration unit and the water supply control valve being provided at the second supply tube.

Further, the bubble sterilizing cleaner according to the present disclosure may be configured as follows.

The fluid supply means may include a first supply tube, a second supply tube, and a water supply control valve, the first supply tube connecting a water source to the water inlet, the second supply tube connecting a fluid supply device to the aeration unit, and the water supply control valve being provided at the first supply tube.

Moreover, the bubble sterilizing cleaner according to the present disclosure may be configured as follows.

The cleaning tank may include an overflow hole, a water reservoir tank, and a fluid sensor, the overflow hole being provided at the side wall portion, the water reservoir tank being provided at an exterior of the side wall portion and storing cleaning water discharged from the overflow hole, and the fluid sensor being configured to sense a fluid in the water reservoir tank.

A water supply rate of the fluid supply means may be controlled by the fluid sensor.

Advantageous Effects

As described above, the bubble sterilizing cleaner according to the present disclosure has the following advantages.

First, the bubble supply unit and the aeration unit are separately provided to allow spraying of microbubble and discharge of water or air to be performed in complexity. Therefore, sterilization and cleaning of objects to be cleaned by microbubbles and flow water can be simultaneously performed, so that the cleaning time can be reduced and the cleaning can be properly performed.

Second, the water supply method is selectable according to the amount or pressure of water of a place where the bubble sterilizing cleaner is installed, so that the utilization of the bubble sterilizing cleaner can be increased.

Third, even when the discharge pressure of the aeration unit is not secured due to the low water amount or low water pressure of the water source, the bubble sterilizing cleaner can discharge water or air by pressurizing the water or air to high pressure. Therefore, the flowing effect of the cleaning water is secured, whereby it is possible to prevent the sterilization and cleaning effects from being deteriorated.

Fourth, even when an operator does not check a water level in the cleaning tank often, the water supply is automatically controlled in accordance with the amount of the cleaning water discharged after use. Therefore, the water level in the cleaning tank is maintained constant within the normal range, whereby it is possible to perform the cleaning continuously and efficiently.

Figure 1:
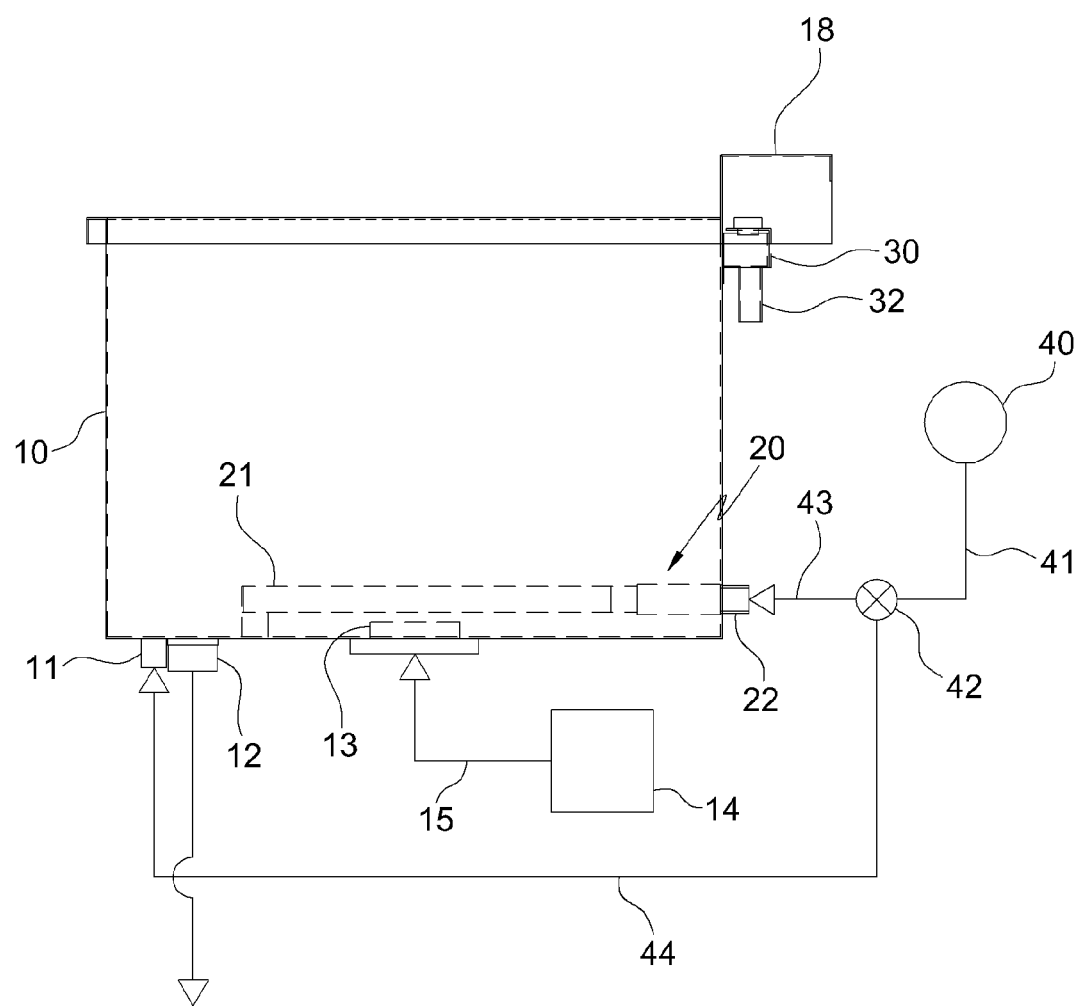
FIGS. 1 to 3 are side, plan, and front views showing a first embodiment of the present disclosure.

| [Description of reference numerals for main parts of the drawings] | |
|---|---|
| 10: cleaning tank | 11: water inlet |
| 12: water outlet | 13: bubble outlet |
| 14: bubble supply unit | 15: bubble supply tube |
| 16: overflow hole | 17: water reservoir |
| 18: cover | |
| 20: aeration unit | 21: aeration tube |
| 21a: aeration hole | 22: supply port |
| 30: water reservoir tank | |
| 31: fluid sensor | |
| 32: drain | |
| 40: water source | 41, 44: first supply tube |
| 42: water supply control valve | |
| 43: second supply tube | |
| 45: fluid supply device | |
| 46 and 47: suction tube | 48: suction port |

BEST MODE

The present disclosure will now be described in detail on the basis of aspects (or embodiments). The present disclosure may, however, be embodied in many different forms and should not be construed as being limited to only the embodiments set forth herein, but should be construed as covering modifications, equivalents or alternatives falling within ideas and technical scopes of the present disclosure.

In the drawings, like reference numerals, particularly, reference numerals having the same last two digits or the same last two digits and letters, refer to like elements having like functions throughout, and unless the context clearly indicates otherwise, elements referred to by reference numerals of the drawings should be understood on the basis of this standard.

Also, for convenience of understanding of the elements, in the drawings, sizes or thicknesses may be exaggerated to be large (or thick), may be expressed to be small (or thin), or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. As used herein, the singular forms are intended to include the plural forms as well, unless the context clearly indicates otherwise.

It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Terms such as 'a first ~' and 'a second ~' are used only for the purpose for distinguishing a constitutive element from other constitutive elements, but the constitutive element should not be limited to a manufacturing order, and the terms described in the detailed description of the invention may not be consistent with those described in the claims.

Figure 3:
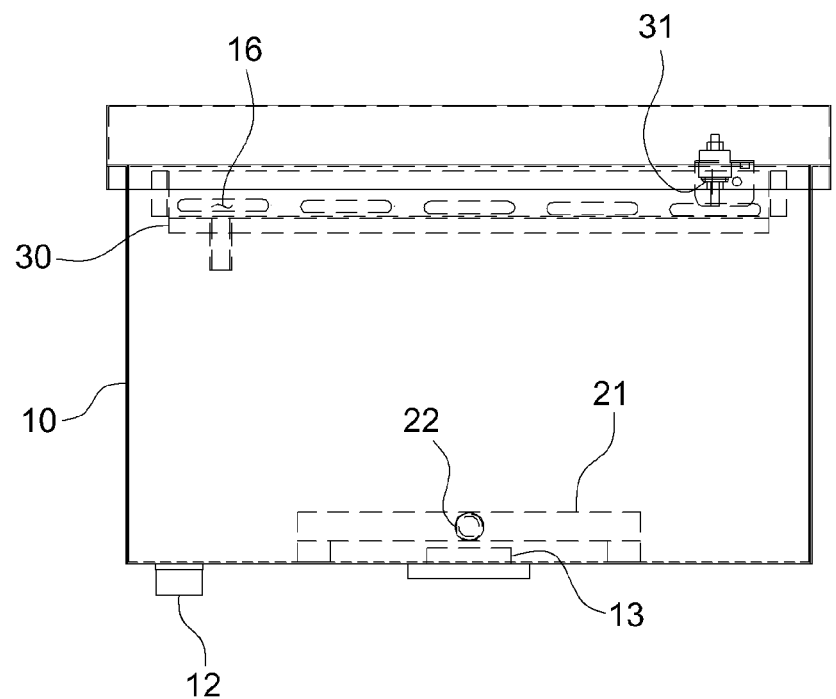
Figure 6:
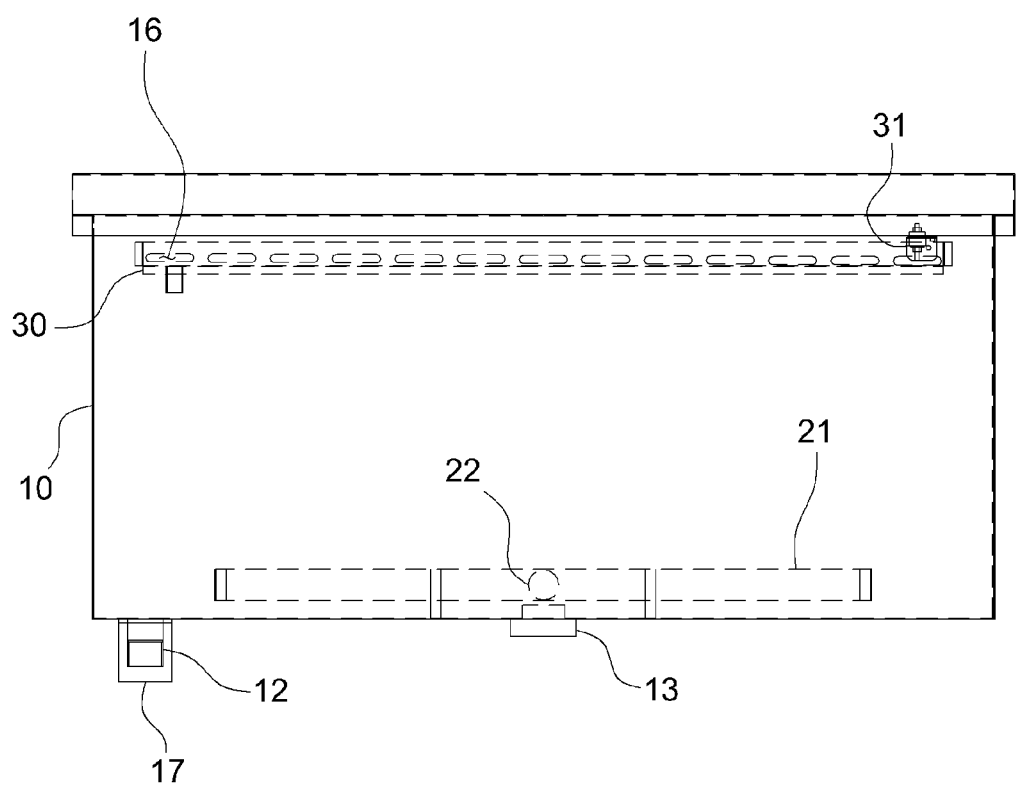

For convenience of the description of a bubble sterilizing cleaner according to the present disclosure, when an approximate direction rather than a precise direction is specified with reference to FIGS. 3 and 6, a lower side is determined on the basis of a direction to which gravity is applied, and up and down directions and right-and-left directions are determined on the basis of the lower side. This standard may be also applied to the other drawings, and directions may be specified and described on the basis of this standard unless the detailed description of the invention and the claims specially indicate otherwise.

Hereinbelow, a bubble sterilizing cleaner according to the present disclosure will be described with reference to the accompanying drawings.

Figure 2:
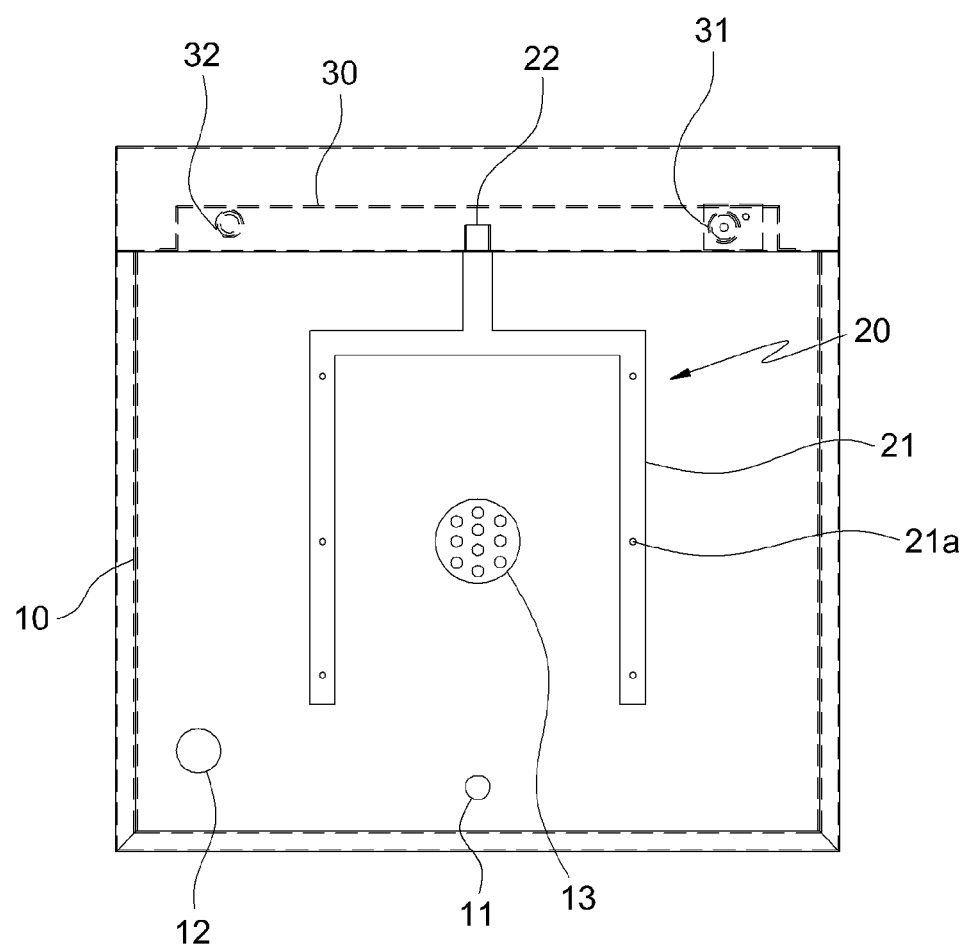
Figure 4:
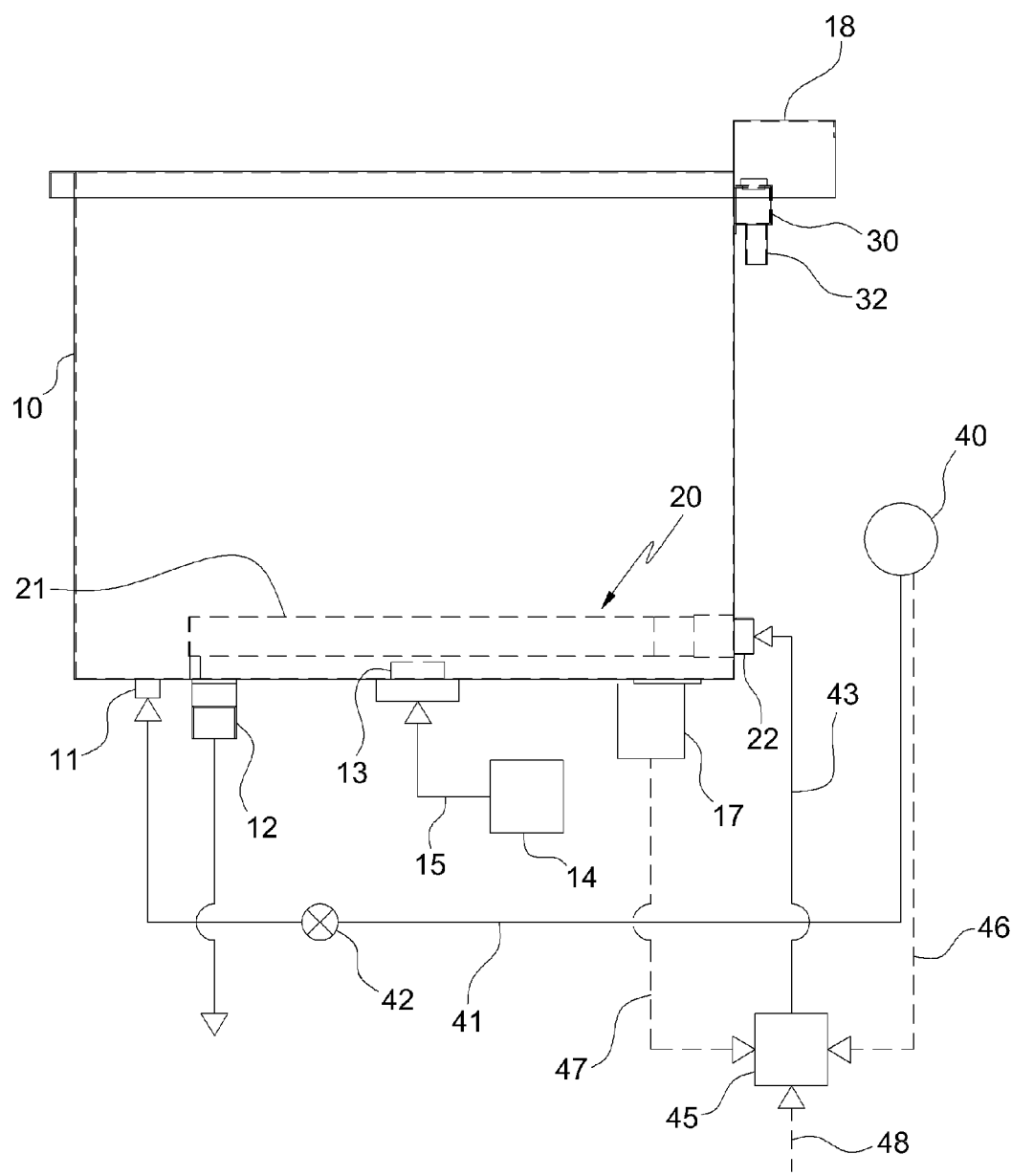
FIGS. 4 to 6 are side, plan, and front views showing a second embodiment of the present disclosure.
Figure 5:
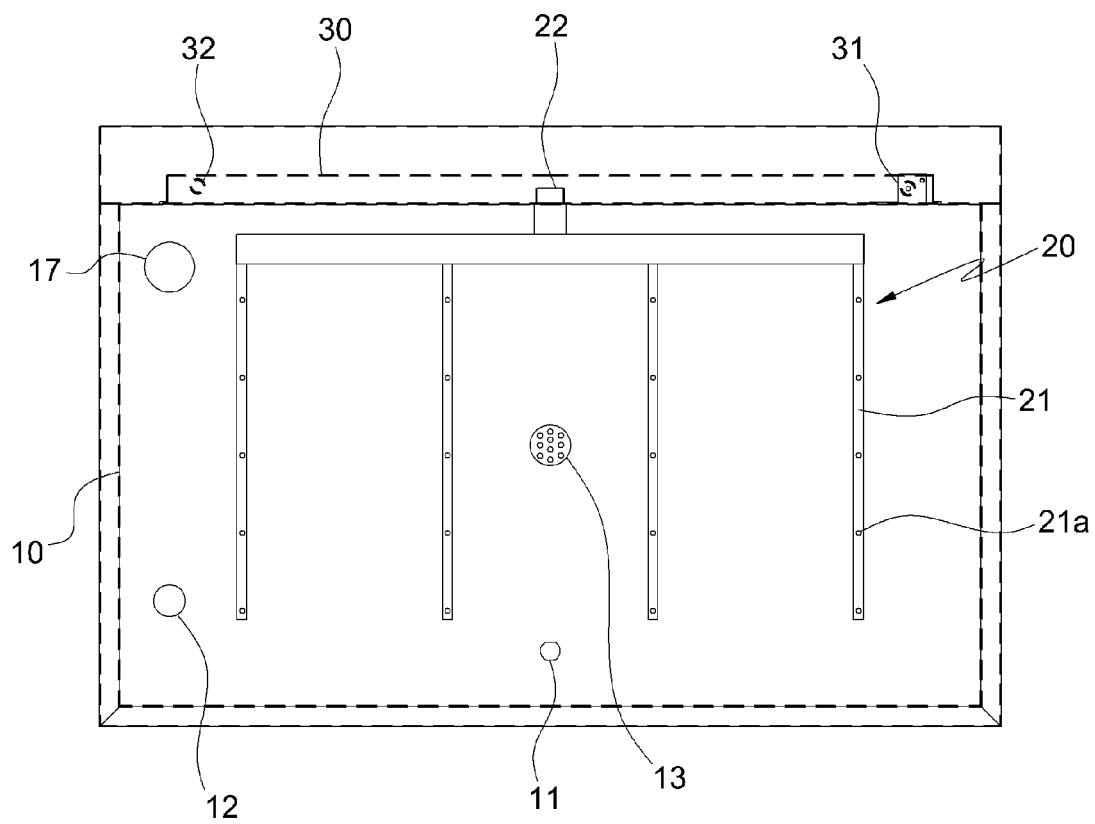

As shown in FIGS. 1 to 3 showing a first embodiment of the present disclosure and FIGS. 4 to 6 showing a second embodiment of the present disclosure, the bubble sterilizing cleaner according to the present disclosure includes a cleaning tank 10, a bubble supply unit 14, an aeration unit 20, and a fluid supply means.

The cleaning tank 10 is formed by being surrounded by a bottom portion and a side wall portion (front, rear, left, and right sides) to be opened upward. While cleaning water is stored in the cleaning tank 10, objects to be cleaned, such as fruits and vegetables, are put into the cleaning tank 10, and the objects to be cleaned are sterilized and cleaned through a vortex of the cleaning water generated by spraying microbubbles and discharging a fluid (water or air).

The cleaning tank 10 includes a water inlet 11 at a first side of an exterior of the bottom portion thereof for supplying cleaning water, a water outlet 12 at a second side of the exterior of the bottom portion thereof for draining the cleaning water after cleaning, and a bubble outlet 13 at the center of the bottom portion thereof for spraying the microbubbles.

However, unlike the first embodiment in which water supply and operation of the aeration unit 20 are performed through a water source 40, for the second embodiment in which water is supplied through the water source 40 and the aeration unit 20 is operated through a fluid supply device 45, the cleaning tank 10 includes a water intake port 17 at the bottom portion thereof for circulating the cleaning water.

The bubble supply unit 14 creates microbubbles and sprays the microbubbles into the cleaning tank 10, so that the microbubbles are mixed with the cleaning water stored in the cleaning tank 10 for primary sterilization and cleaning by microbubbles.

For reference, microbubbles are very small bubbles from $\frac{1}{100}$ mm to $\frac{1}{1000}$ mm and are eco-friendly energy source that use only water and air. Unlike general bubbles, microbubbles are less than and equal to 50 μm in diameter, but larger than 1 μm.

The microbubbles having a milky-white color provide various effects such that, as the microbubbles burst continuously and decline in water and disappear and at the same time rise at a very slow speed, shock waves including 40 Khz ultrasonic waves generate large amounts of anions and instantaneous high temperature heat at a rate of 400 km/h.

In addition, the microbubbles maximize the cleaning effect by removing various agricultural pesticide ingredients on fruits and vegetables and foreign matter remaining on dishes and clothing by using shock waves having sterilizing effect and powerful ultrasonic waves.

In the bubble supply unit 14 of the present disclosure, various physics laws, such as the hydrodynamic method, fluid machinery method, ultrasonic method, plasma method, and photoreaction method are used to create microbubbles. For example, microbubbles may be created by applying Bernoulli's principle, which expresses simply 'when the fluid velocity is increased, the fluid pressure is decreased' using ultra-fine spray holes or the 'Leonard effect', which is a phenomenon where negative ions without carrying ozone are generated in water droplets such as waterfall (Philip Eduard Anton von Lenard (1862~1947), winner of the Nobel Prize for Physics (1905, for his work on cathode rays), studied what became known as the Leonard effect, which is generation of negative ions during the process of water colliding with solids. The Leonard effect is also known as the waterfall effect).

Alternately, microbubbles may be created in various ways, such as by using chemical laws (for example, microbubbles may be created by mixing certain additives that react with water to create microbubbles or gases into cleaning water or by using an electrical reaction).

The bubble supply unit 14 is connected to the bubble outlet 13 through a bubble supply tube 15 to supply the created microbubbles into the cleaning water in the cleaning tank 10.

Although not shown in the drawings, a separate circulation tube may be provided between the cleaning tank 10 and the bubble supply unit 14, so that created microbubbles are supplied into cleaning water in the cleaning tank 10 therethrough, and at the same time, after the cleaning water mixed with the microbubbles is supplied into the bubble supply unit 14, microbubbles is additionally created and supplied again into the intake cleaning water. Accordingly, the microbubble content in the cleaning tank 10 may be increased through the infinite supply of microbubbles, thereby maximizing the cleaning effect.

In the present disclosure, the aeration unit 20 discharging water or air is provided at one or more locations of an upper portion of the cleaning tank 10 where the cleaning is performed by using the microbubbles as described above, the side wall portion of the cleaning tank 10, or the bottom portion of the cleaning tank 10.

The bubble sterilizing cleaner of the present disclosure is configured to discharge water or air into the cleaning tank 10 by using the aeration unit 20, so that the cleaning water mixed with the microbubbles generates a vortex in the cleaning tank 10. Accordingly, the primary sterilization and cleaning by the microbubbles and secondary sterilization and cleaning using a flowing water effect due to discharge of water or air are performed.

That is, when water or air is discharged from one or more locations of the upper portion, side wall portion (front, rear, left, and right sides), and bottom portion of the cleaning tank 10, the cleaning by flowing water (running water) is performed as the cleaning water continues to flow in the cleaning tank 10. Accordingly, the cleaning effect using the microbubbles and the flowing effect of the cleaning water acts in combination thereby enabling eco-friendly cleaning.

In addition, it is possible to expect a better cleaning effect than a cleaning in which microbubbles are simply mixed with cleaning water, and to reduce the cleaning time.

As the aeration unit 20, FIGS. 2 and 4 show an embodiment in which at least one aeration tube 21 having a discharge hole 21a discharging upward the cleaning water from the bottom portion of the cleaning tank 10, and there is no limit to the number or a shape (for example, circular) of the aeration tube 21.

At this time, the fluid discharged by the aeration unit 20 includes all forms of pure water (raw water), mixing air bubbles for cleaning with water, or separately discharging water and air.

The fluid supply means is connected to the water inlet 11 and the aeration unit 20 to supply the fluid.

In the present disclosure, the cleaning water is continuously discharged through an overflow hole 16, which will be described below, and consumed by the flowing water effect due to the aeration unit 20. At this point, when the consumption of the cleaning water is high for cleaning a relatively heavy cleaning object, the supply of the cleaning water is increased by using the water inlet 11 and the aeration unit 20. On the contrary, when the consumption of the cleaning water is low for cleaning a relatively light cleaning object, the water supply of the cleaning water is performed by using the aeration unit 20 without the water inlet 11, and instead of the water inlet 11, the aeration unit 20 performs both functions of generating the vortex and supplying water by water spraying.

In the present disclosure, a specific method or structure of the fluid supply means varies according to the amount of water or the degree of water pressure in a location where the bubble sterilizing cleaner is installed.

When the amount of water or the degree of water pressure of the raw water supplied from the water source 40 is sufficient to generate a vortex in the cleaning water, as shown in FIG. 1, the fluid supply means according to the first embodiment includes first supply tubes (41 and 44), a second supply tube 43, and a water supply control valve 42. The first supply tubes (41 and 44) connect the water source 40 to the water inlet 11, the second supply tube 43 branches from the first supply tubes (41 and 44) and is connected to the aeration unit 20, and the water supply control valve 42 is provided at a branching part between the first and second supply tubes (41, 43, and 44).

The water source 40 is a raw water supply device connected to the general water supply and may be provided with a separate pump.

The water supply control valve 42 controls a movement direction of a fluid to allow the raw water supplied from the water source 40 to be filled in the cleaning tank 10 through the aeration unit 20 or both the aeration unit 20 and the water inlet 11. At this time, the aeration unit 20 discharges water so that sterilization and cleaning due to the flowing water effect are performed.

That is, when the consumption of the cleaning water is low, the water supply control valve 42 controls the raw water to flow through only the second supply tube 43 by using a fluid sensor 31 which will be described below so that the vortex formation and water supply of the cleaning water are performed with only the aeration unit 20. When the consumption of the cleaning water is high, the water supply control valve 42 controls the raw water to flow through both the first and second tubes (41, 43, and 44) by using the fluid sensor 31 so that water is discharged through a supply port 22 of the aeration unit 20 and water is supplied through both the aeration unit 20 and the water inlet 11, thereby maintaining a water level of the cleaning tank 10 constant.

In addition, as a modification of the fluid supply means according to the first embodiment, the present disclosure includes the second supply tube 43 connecting the water source 40 to the aeration unit 20, and the water supply control valve 42 provided at the second supply tube 43.

That is, the modification has a structure in which the first supply tube 44 in the first embodiment is omitted (in FIG. 1, the reference numeral 41 functions as the second supply tube). When the amount of water and the water pressure of the water source are sufficient, without tube-connecting the water source 40 to the water inlet 11, the water supply and vortex formation of the cleaning water are performed by only the aeration unit 20.

When the amount or pressure of raw water supplied from the water source 40 is insufficient so as to generate the vortex of the cleaning water, as shown in FIG. 4, the second embodiment of the fluid supply means includes the first supply tube 41 connecting the water source 40 to the water inlet 11, the water supply control valve 42 provided at the first supply tube 41, and the second supply tube 43 connecting the fluid supply device 45 to the aeration unit 20.

The fluid supply device 45 consists of a hydraulic pump or a compressor, and pressurizes water or air to a pressure above a certain level and discharges the water or air into the cleaning tank 10, so that the vortex of the cleaning water is generated.

At this time, water supply in the cleaning tank 10 is performed through only the water inlet 11 connected to the water source 40, and the aeration unit 20 functions to discharge water or air for the vortex formation, which is an original function thereof.

That is for preventing the sterilization and cleaning effects from being deteriorated, when the amount or pressure of water in the water source 40 is low and sufficient pressure for the vortex formation is not generated.

In the second embodiment, the fluid supply device requires an operating fluid (water or air) that is discharged for the vortex formation, and a fluid supply method to the fluid supply device 45 may vary according to the type of fluid.

When water (liquid) is discharged to generate a vortex like when the hydraulic pump is used, a first suction tube 46 connecting the water source 40 to the fluid supply device 45 is provided to allow the raw water pressurized to high pressure to be supplied to the supply port 22 of the aeration unit 20 through the second supply tube 43 and then to be discharged.

Also, as another example of discharging water (liquid) to generate a vortex like when the hydraulic pump is used, a second suction tube 47 connecting the water intake port 17 of the cleaning tank 10 to the fluid supply device 45 is provided to allow the highly pressurized cleaning water to be supplied to the supply port 22 of the aeration unit 20 through the second supply tube 43 and then be discharged.

When air (gas) is discharged to generate a vortex like when the compressor is used, an air suction port 48 of the compressor is provided to allow air that is pressurized to high pressure by being exposed to the atmosphere to be supplied to the supply port 22 of the aeration unit 20 through the second supply tube 43 and then be discharged.

Therefore, in the present disclosure, it is possible to stably maintain the supply of the cleaning water and the discharge of water or air in accordance with a condition of a location where the bubble sterilizing cleaner is provided so as to prevent the sterilization and cleaning effects from being deteriorated.

In addition, the cleaning tank 10 includes the overflow hole 16 provided at the side wall portion thereof, a water reservoir tank 30 provided at exteriors of the side wall portion and storing the cleaning water discharged through the overflow hole 16, and the fluid sensor 31 configured to sense a fluid in the water reservoir tank 30.

A water supply rate of the fluid supply means is controlled by the fluid sensor 31.

That is, when the water supply is large in the first and second embodiments, the cleaning water may overflow as a water lever in the cleaning tank 10 is continuously increased, and when foreign matter detached from the objects to be cleaned is left in the cleaning tank 10 during the cleaning, the foreign matter may be attached to the objects to be cleaned while the objects to be cleaned are collected after the cleaning. Accordingly, it is possible to maintain the level of the cleaning water and to discharge the foreign matter through the overflow hole 16.

At this time, the water supply rate is controlled by the fluid sensor 31 according to the amount of discharged cleaning water, so that the water level in the cleaning tank 10 is maintained within a normal range.

In detail, when the cleaning water is discharged to the water reservoir tank 30 below a certain level and the fluid sensor 31 does not detect the discharge of the cleaning water, the fluid sensor 31 determines that the water level in the cleaning tank 10 is sufficiently maintained within the normal range, thereby blocking the water supply by using the water supply control valve 42.

When the cleaning water is discharged to the water reservoir tank 30 above the certain level and the fluid sensor 31 detects the discharge of the cleaning water, the fluid sensor 31 determines that the water level in the cleaning tank 10 falls to a lower limit and the cleaning water is insufficient, thereby supplying water through the water inlet 11 and/or the aeration unit 20.

During the cleaning, the water level in the cleaning tank 10 may be constantly maintained within the normal range.

Since the high-pressure water or air is discharged through the aeration unit 20 to generate the vortex or flow of the cleaning water, the water level of the cleaning water during the cleaning is not maintained at the constant level, and even when the water level sensor is provided in the cleaning tank 10, it is not possible to accurately detect the level of the cleaning water through the water level sensor.

In the present disclosure, through the above configuration, even when an operator does not separately check the water level, the level of the cleaning water may be maintained constant and it is possible to prevent the sterilization and cleaning effects from being deteriorated.

Unexplained reference numeral 32 is a drain provided for draining the cleaning water in the water reservoir tank 30, and unexplained reference numeral 18 is a cover provided for protecting the water reservoir tank.

Meanwhile, the cleaning tank 10 and the water reservoir tank 30 are formed of thin panels and side wall portions thereof are assembled to install the water reservoir tank 30. When the side wall portions of the cleaning tank 10 and the water reservoir tank 30 are coupled by bolting, any one of a thread or a head portion of a bolt is located inside the water reservoir tank 30. In this case, use of a nut or tightening of the bolt is not possible, so that the installation of the water reservoir tank 30 may not be maintained solidly.

In particular, due to the thinness of the side wall portions of the cleaning tank 10 and the water reservoir tank 30, it is difficult to form a thread on an inner circumferential surface of a bolt fastening hole. Therefore, the present disclosure includes a nut-integrated mounting bolt 50 to solve the above problem.

Figure 7A:
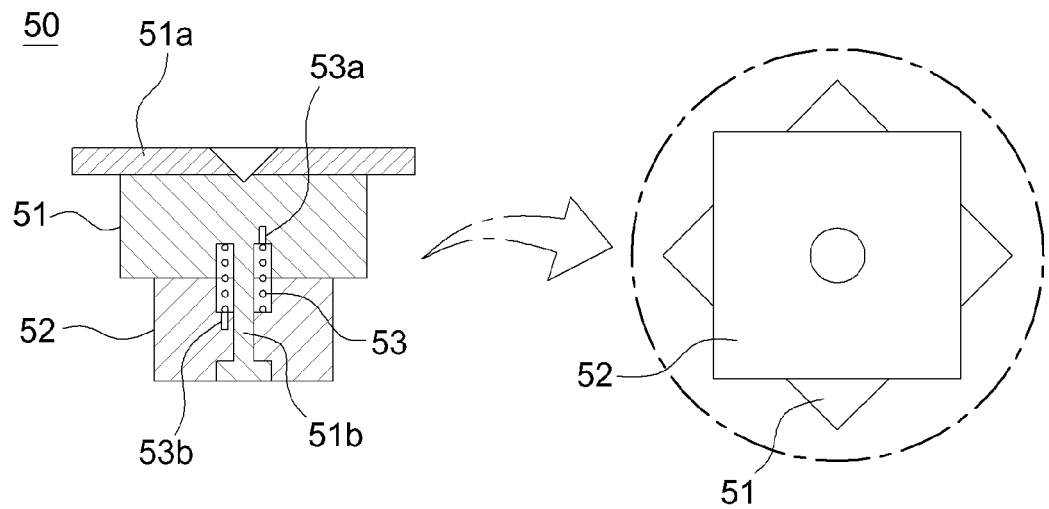
FIGS. 7A and 7B are views showing a mounting bolt of the present disclosure.
Figure 7B:
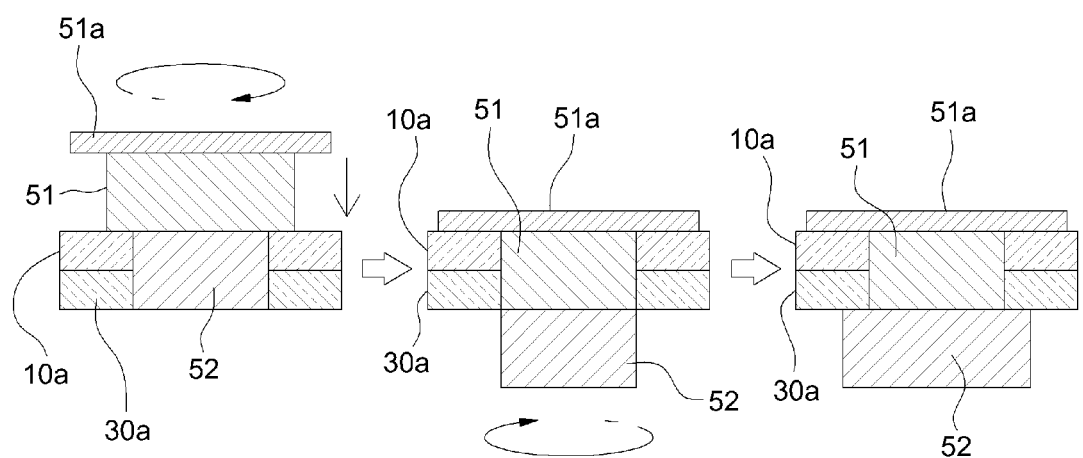

As shown in FIGS. 7A and 7B, the nut-integrated mounting bolt 50 for the above problem includes a bolt body 51, a nut body 52, and an elastic body 53. The bolt body 51 is formed in a rectangular shape and has a head portion 51*a* at a first side thereof, the nut body 52 is formed in a rectangular shape having the same size as the bolt body 51 and coupled to a second side of the bolt body 51 to be rotatable leftward and rightward, and the elastic body 53 is interposed between the bolt body 51 and the nut body 52 and elastically supports the nut body 52 so as to allow the nut body 52 to be rotated in a first direction (counterclockwise) so that a corner of the nut body 52 is crossed with a corner of the bolt body 51.

When the bolt body 51 is rotated in a second direction (clockwise) and then pressurized while the nut body 52 is fitted into the quadrangle-shaped bolt fastening hole (not shown) provided at each of the side wall portions of the cleaning tank 10 and the water reservoir tank 30, the bolt body 51 is fitted into the fastening hole, and the nut body 52 released from the fastening hole is rotated and returned in the first direction to be converted into a nut.

In detail, the bolt body 51 is formed in a hexahedron in which a thread is not provided on an outer circumferential surface thereof, and has the head portion 51*a*, which has a tool groove at a first surface thereof similar to a normal bolt.

The bolt body 51 has a rotating shaft 51*b* protruding from a second surface thereof. The rotating shaft 51*b* is coupled to the nut body 52 by passing through the nut body 52 to be locked thereto, thereby coupling the bolt body 51 to the nut body 52 to be rotatable relatively.

The nut body 52 is formed in a hexahedron having the same size (widths of front to rear and left to right and thickness) as that of the bolt body 51, and is coupled with the rotating shaft 51*b* fitted therein.

In the bolt body 51 and the nut body 52, a receiving groove is provided at a circumferential surface of the rotating shaft 51b, and the elastic body 53 is provided at the receiving groove.

The elastic body 53 is a kind of a torsion spring, in which a first end 53a thereof is coupled to the bolt body 51 and a second end 53b thereof is coupled to the nut body 52, and an elastic force acts in a direction of separating the opposite ends 53a and 53b from each other.

Although not shown in the drawings, a locking protrusion is provided between the rotating shaft 51b and the nut body 52 to limit a rotation angle of the nut body 52.

The mounting bolt 50 is configured such that, with a state where the bolt body 51 (or the nut body 52) is not under an external force, the bolt body 51 and the nut body 52 are rotated in opposite directions due to the elastic force of the elastic body 53. At this time, the rotation angle is limited by the locking protrusion, so that each of the corners of the bolt body 51 and the nut body 52 are alternately disposed to be crossed each other on the basis of a plane view.

In order to couple the water reservoir tank 30 to the cleaning tank 10, when the mounting bolt 50 is fitted into the quadrangle-shaped bolt fastening hole (not shown) provided at each of the side wall portions of the cleaning tank 10 and the water reservoir tank 30 from the inside of the cleaning tank 10, the nut body 52 is fitted into the fastening hole and the bolt body 51 is blocked not to be inserted into the fastening hole due to the crossed structure of the corner portions.

In this state, when the head portion 51a is rotated in one direction with a tool such as a screwdriver, the opposite ends 53a and 53b of the elastic body 53 are pressurized and the bolt body 51 is fitted to a quadrangle structure of the fastening hole, and when the head portion 51a is pressed, the bolt body 51 is fitted into the fastening hole.

Therefore, when the bolt body 51 is fitted in the fastening hole, the nut body 52 is removed from the fastening hole, and the external force limiting the rotation of the nut body 52 is released. Then, the elastic force is applied so that the opposite ends 53a and 53b of the elastic body 53 to be separated from each other and the nut body 52 is rotatably returned to an initial position thereof, so that the corner of the nut body 52 is crossed with the bolt body 51.

When the fastening of the mounting bolt 50 is finished, the side wall portions of the cleaning tank and the water reservoir tank are coupled to each other by the blocking between the head portion 51a and the nut body 52 so that the mounting bolt 50 is not removed from the fastening hole. That is, the coupling between the side wall portions, that is, between the cleaning tank 10 and the water reservoir tank 30 is performed easily and solidly.

Although the bubble sterilizing cleaner of the present disclosure has been described for illustrative purposes with reference to the accompanying drawings, those skilled in the art will appreciate that various modifications, additions, and substitutions are possible, and such modifications, additions, and substitutions are to be interpreted as belonging to the scope of the present disclosure.

The invention claimed is:

1. A bubble sterilizing cleaner comprising:
a cleaning tank having a water inlet and a bubble outlet and in which cleaning water is stored;
a bubble supply unit connected to the bubble outlet via a bubble supply tube and configured to spray microbubbles into the cleaning tank;
an aeration unit configured to discharge water or air to the cleaning tank and provided at one or more locations of an upper portion of the cleaning tank, a side wall portion of the cleaning tank, and a bottom portion of the cleaning tank, the aeration unit including at least one aeration tube having a discharge hole; and
a fluid supply means connected to one of the water inlet and the aeration unit or to both the water inlet and the aeration unit to supply a fluid,
wherein the cleaning tank comprises: an overflow hole provided at the side wall portion; a water reservoir tank provided outside the side wall portion and configured to store the cleaning water discharged from the overflow hole; and a fluid sensor configured to sense the fluid of the water reservoir tank and control a water supply rate of the fluid supply means,
wherein the bubble sterilizing cleaner further comprises: a nut-integrated mounting bolt configured to assemble the side wall portion of the cleaning tank and a side wall portion of the water reservoir tank to each other,
wherein the nut-integrated mounting bolt comprises: a rectangular-shaped bolt body having a head portion at a first portion thereof; a rectangular-shaped nut body having a same size as the bolt body and coupled to a second end of the bolt body to be rotatable leftward and rightward; and an elastic body interposed between the bolt body and the nut body and configured to elastically support the nut body so as to allow the nut body to be rotated in a first direction, so that a corner of the nut body is crossed with a corner of the bolt body, and
wherein, when the bolt body is rotate in a second direction and then pressurized while the nut body is fitted into a rectangular-shaped bolt fastening hole provided at each of the side wall portion of the cleaning tank and the side wall portion of the water reservoir tank, as the bolt body is fitted into the fastening hole, the nut body released from the fastening hole is rotatably returned in the first direction to be converted into a nut.

2. The bubble sterilizing cleaner of claim 1, wherein the fluid supply means comprises a first supply tube connecting a water source to the water inlet, a second supply tube branching from the first supply tube and connected to the aeration unit, and a water supply control valve provided at a branching part between the first supply tube and the second supply tube.

3. The bubble sterilizing cleaner of claim 1, wherein the fluid supply means comprises a second supply tube connecting a water source to the aeration unit, and a water supply control valve provided at the second supply tube.

4. The bubble sterilizing cleaner of claim 1, wherein the fluid supply means comprises a first supply tube connecting a water source to the water inlet, a second supply tube connecting a fluid supply device comprising a hydraulic pump or a compressor to the aeration unit, and a water supply control valve provided at the first supply tube.

* * * * *